T. PATTINSON.
WATER WHEEL.
No. 66,382.  Patented July 2, 1867.
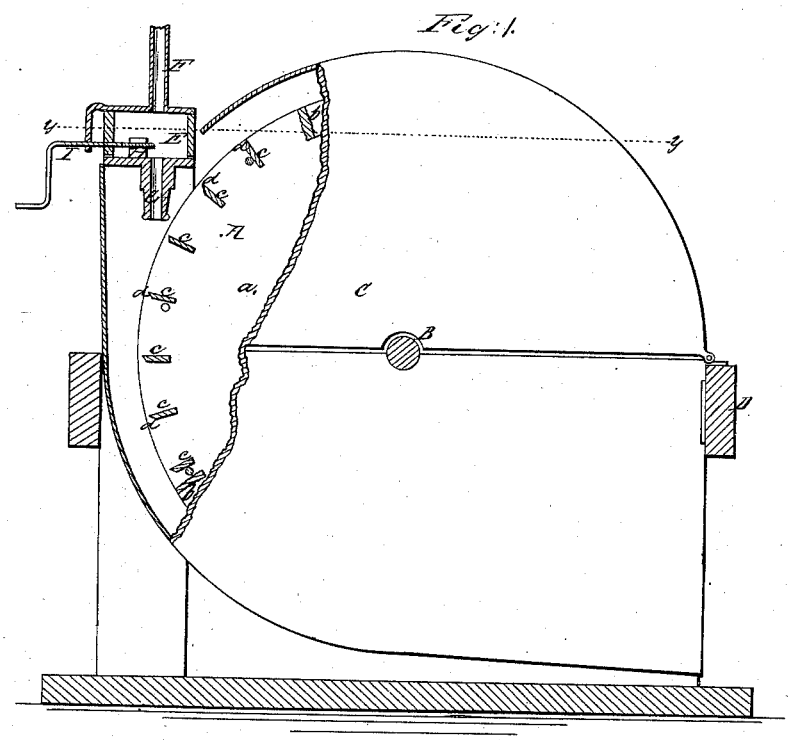
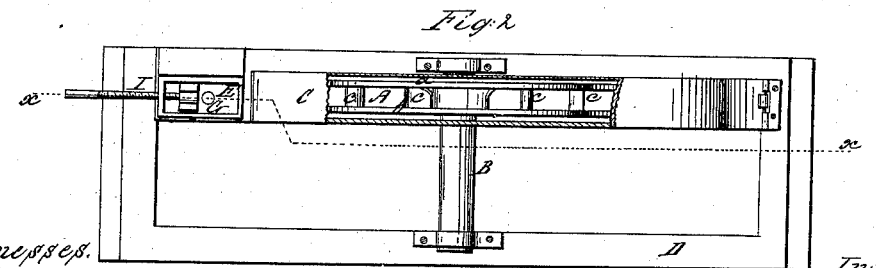
Witnesses.  Inventor
Theo Tusch  Thos Pattinson
J. A. Service  Per Munn & Co.
 Attorneys

United States Patent Office.

THOMAS PATTINSON, OF LITTLE YORK, CALIFORNIA

Letters Patent No. 66,382, dated July 2, 1867.

---

IMPROVEMENT IN WATER-WHEELS.

---

The Schedule referred to in these Letters Patent and making part of the same.

---

TO ALL WHOM IT MAY CONCERN:

Be it known that I, THOMAS PATTINSON, of Little York, in the county of Nevada, and State of California, have invented a new and improved Water-Wheel; and I do hereby declare that the following is a full, clear, and exact description thereof, which will enable others skilled in the art to make and use the same, reference being had to the accompanying drawing, forming a part of this specification, in which—

Figure 1 is a side view of my invention, with the wheel case partially in section or broken away as indicated by the line $x$ $x$, fig. 2.

Figure 2, a horizontal section of the same taken in the line $y$ $y$, fig. 1.

Similar letters of reference indicate like parts.

This invention relates to a new and improved water-wheel in which the water is applied to the wheel in such a manner as to insure the most favorable results as regards the percentage of power obtained, economy in the consumption of water and in the construction of the wheel.

A represents the wheel, which is hung on a horizontal shaft, B, and consequently rotates in a vertical plane. The wheel in this instance is constructed of a circular disk, $a$, firmly keyed on the shaft B, and forming one side of the wheel, and a rim, $b$, between which rim and the outer part of $a$ buckets $c$ are secured at suitable and equal distances apart, the lower edges of said buckets at their rear sides being bevelled as shown at $d$, so as to meet with as little resistance from the atmosphere as possible during the rotation of the wheel. This wheel is enclosed within a case, C, of such dimensions as to allow the wheel to rotate freely within it without coming in contact with any portion, and still not allow any unnecessary space between the wheel and the case. The case C is supported by a suitable framing, D, the same which supports the wheel-shaft B. E represents a penstock which is supplied with water through a tube or pipe, F, and G is a discharge tube or nozzle, through which the water is discharged upon the wheel. Within the penstock there is a slide or gate, H, operated through the medium of a screw, I. By means of this gate the water may be let upon and cut off from the wheel with the greatest facility. It is designed that the water shall pass from the penstock E, under static pressure, and the water will act upon the buckets of the wheel with a force due to that pressure. There will be no loss of water as the nozzle G will direct it all upon the buckets $c$ of the wheel. The water is discharged from an opening in the lower part of the case C, and is let upon the wheel above its shaft B in a perpendicular column, as will be understood by referring to fig. 1. This wheel has been practically tested and has been found to operate well, giving out a large percentage of the power of the water.

I claim as new, and desire to secure by Letters Patent—

The construction and arrangement in the case C of the water-wheel A, provided with the buckets $c$, whose under side $d$ is bevelled, the penstock E having supply pipe or tube F, and provided with the gate H, operated by the screw I, the removable discharge tube G attached to its under side, whereby the water under static pressure is delivered in a perpendicular column upon the buckets $c$, substantially as herein shown and described.

THOS. PATTINSON.

Witnesses:
 VALENTINE CURRAN,
 R. M. BURCH.